United States Patent
Kometani et al.

(10) Patent No.: US 6,433,455 B1
(45) Date of Patent: Aug. 13, 2002

(54) VEHICLE AC GENERATOR

(75) Inventors: Haruyuki Kometani; Toshiyuki Yoshizawa; Yoshihito Asao; Katsumi Adachi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/627,234

(22) Filed: Jul. 27, 2000

(30) Foreign Application Priority Data

Jan. 26, 2000 (JP) ........................................ 2000-017076

(51) Int. Cl.[7] .............................................. H02K 19/22
(52) U.S. Cl. ........................................................ 310/263
(58) Field of Search ................................ 310/261, 263, 310/42, 181; 29/596–598

(56) References Cited

U.S. PATENT DOCUMENTS

| | | | | |
|---|---|---|---|---|
| 3,004,181 A | * | 10/1961 | Noddin ........................ 310/263 |
| 3,714,484 A | * | 1/1973 | Habert ........................ 310/263 |
| 4,201,930 A | * | 5/1980 | Inagaki et al. .............. 310/263 |
| 4,972,114 A | * | 11/1990 | Frister ........................ 310/263 |
| 5,270,605 A | * | 12/1993 | Lefrancois et al. ......... 310/263 |

FOREIGN PATENT DOCUMENTS

JP          5-91702          4/1993

* cited by examiner

*Primary Examiner*—Tran Nguyen
(74) *Attorney, Agent, or Firm*—Sughrue Mion, PLLC

(57) ABSTRACT

The vehicle AC generator comprises a stator core 4 having a stator coil 5, a first rotor core 8 and a second rotor core 9 provided on an inner diameter side of the stator core 4 to rotate, a field coil 10 for magnetizing the first rotor core 8 and the second rotor core 9, and a plurality of pole pieces 8a, 9a provided on the first rotor core 8 and the second rotor core 9 to extend in an axis direction of the rotation axis, and arranged to engage alternatively with each other via a predetermined clearance, and provided to oppose to an inner diameter surface of the stator core 4 via a predetermined clearance, wherein the poles pieces 8a, 9a are formed into an almost trapezoidal shape to reduce a width toward its tip portion in a rotation direction, and a skew angle against the axis direction of both side surfaces of the pole pieces in a rotation direction is set small on a root side and also set large on a tip side.

5 Claims, 7 Drawing Sheets

VEHICLE AC GENERATOR

BACKGROUND OF THE INVENTION

The present invention relates to a vehicle AC generator having a Landor rotator.

FIG. 7 to FIG. 11 show a configuration of a vehicle AC generator in the prior art, FIG. 7 is a sectional view of the generator, FIG. 8 is a perspective view of a rotor, FIG. 9 is a perspective view of a stator, FIG. 10 is a perspective view of a stator core, and FIG. 11 is an illustrative view of a relationship between the rotor cores and the stator core. In FIG. 7, 1 denotes a front bracket; 2, rear bracket; and 3, a stator put between the front bracket 1 and the rear bracket 2. As shown in FIG. 7, FIG. 9, and FIG. 10, the stator 3 consists of a stator core 4, and a three-phase stator coil 5 inserted in a slot 4a of the stator core 4.

In FIG. 7 and FIG. 8, 6 is a rotor which fixed onto a rotation axis 7 whose both ends are supported by the front bracket 1 and the rear bracket 2. The rotor 6 comprises a first rotor core 8, a second rotor core 9, a field coil 10 wound between both rotor cores 8 and 9, fans 11, 12 provided on the back surfaces of both rotor cores 8 and 9, a pulley 13 provided on the outside of the rotation axis 7 on the front bracket 1 side, and a slip ring 14 provided on the inside of the rotation axis 7 on the rear bracket 2 side to supply a current to the field coil 10. Then, 15 denotes a brush for supplying a current to the slip ring 14; 16, a brush holder for holding the brush 15; 17, a rectifier for rectifying the AC output of the stator coil 5; and 18, a regulator for controlling the output voltage of the stator coil 5 by adjusting the current of the field coil 10.

Also, as shown in FIG. 8 and FIG. 11, a plurality of almost trapezoidal pole pieces 8a, 9a whose width is reduced toward a tip portion in the rotation direction are formed on the first rotor core 8 and the second rotor core 9 respectively so as to oppose to an inner diameter surface of the stator core 4. Thee pole pieces 8a, 9a are arranged to engage alternatively via a predetermined clearance, and magnetized alternatively to the N pole and the S pole. In addition, in order to suppress the electromagnetic sound by smoothing the magnetic flux distribution in the air gap, chamferings 8b, 9b are provided on corner portions between outer surfaces of the pole pieces 8a, 9a opposing to the stator core 4 and both end surfaces in the rotation direction.

In the vehicle AC generator constructed as above in the prior art, the rotor 6 is driven by the internal combustion engine via pulley 13 while the current is supplied from a battery (not shown) mounted in the vehicle to the field coil 10 via the brush and the slip ring 14, the rotor 6 generates a rotating magnetic field, then the three-phase AC voltage is generated in the stator coil 5 by this rotating magnetic field, and then this voltage is rectified by the rectifier 17 to be supplied lo a load (not shown).

In this manner, when the generator is in the running state and the load is composed or a resistance load, an output current of the generator can be expressed by the following equation.

$$I = KBD \times 1/L / \{l+[(R+r)/\omega L]^2\}^{1/2} \tag{1}$$

where K is a constant, B is a magnetic flux density in an air gap, D is an outer diameter of the rotor 6, l is a conductor length of the stator coil 5, L is a self-inductance of the stator coil 5, R is a resistance value of the load, r is a resistance value of the stator coil 5, and $\omega$ is an angular velocity of the rotating magnetic field.

In Eq. (1), parameters other than the angular velocity $\omega$ are decided based on design specifications of the generator and load conditions. Then, if the number of revolution of the generator, i.e., $\omega$ is increased, the output current characteristic exhibits the saturation characteristic because of the influence of the reactance $\omega L$ which is also Increased together with $\omega$. The current Is in this saturation state can be expressed by $$Is\ BD \times 1/L \tag{2}$$

Accordingly, it is understood that, in order to increase the output current at the time of high speed rotation of the generator, i.e., the saturation current Is to obtain the higher output, the magnetic flux density B, the diameter D of the rotor, and the conductor length l of the stator coil 5 must be increased and also the self-inductance L of the stator coil 5 rust be reduced.

However, in order to decrease the inductance L, the number of turns of the stator coil 5 must be reduced. But this is not effective in increasing the output current because such reduction results in reduction of the conductor length l of the stator coil 5 at the same time. In order to increase the output while avoiding the increase in sire of the generator, i.e., without the change of the D in above Eq. (2), there is no way to increase the magnetic flux density D. However, in such generator, tile magnetic flux density B in the loaded condition is extremely reduced rather than the magnetic flux density B in no load condition because of the armature reaction caused by the output current Is. Therefore, the increase of the magnetic flux density B in the loaded condition, i.e., the suppression of the armature reaction is the necessary condition to increase the output current of the generator.

Further, in the low speed revolution of the generator, the corresponding number of revolution is needed to increase the generation voltage up to a predetermined value (battery voltage), and also the output cannot be obtained unless the exciting current value flowing into the field coil 10 is compensated. Therefore, the output current of the generator does not rise unless the number of revolution comes up to the predetermined number of revolution. Since the number of revolution required for the rising of the output current is in inverse proportion to the generated voltage of the stator coil 5, the generated voltage of the stator coil 5 must be increased to lower the rising number of revolution required for the output current in the low speed revolution. The generated voltage E can be expressed by $$E\ Blv = Bl\omega D/2 \tag{3}$$

As given in Eq. (3), the magnetic flux density B must also be increased to improve the output characteristic in the low speed revolution. Here the magnetic flux density B corresponds to the magnetic flux density in the air gap formed between the pole pieces 8a, 9a in the magnetic path indicated by the magnetic flux Φ in FIG. 7 and the stator core 4. Thus, the reduction of the magnetic reluctance in the air gap leads to the increase of the output in the low speed revolution.

Since the vehicle AC generator is driven by the internal combustion engine at a predetermined speed increasing ratio, the available range of the number of revolution extends from 0 to 18,000 rpm. In particular, the improvement of the output characteristic is requested in the neighborhood of the number of revolution of the generator of about 1,500 rpm, which corresponds to the idling number of revolution of the internal combustion engine, and the number of revolution of the generator of about 6,000 rpm, which corresponds to the normal running state of the vehicle. Because the number of revolution at which the above output current Is becomes the saturation state is about 5,000 rpm, such configuration must be employed as the generator that importance of the increase of the output current Is in the saturation state and the increase of the output current in the idling operation by lowering the number of revolution at the rising of the output current are considered.

To increase the magnetic flux density B in the air gap, as described above, is necessary for the reduction of the number of revolution of the rising output current, i.e., the improvement of the output characteristic in the low speed revolution. This increase can be attained by reducing the magnetic reluctance in the air gap. However, if areas of the pole pieces 8a, 9a of the rotor 6 are increased to reduce the magnetic reluctance in the air gap, widths of the pole pieces 8a, 9a must be increased in the rotation direction to avoid the increase in size of the generator. As a result, clearances between neighboring pole pieces 8a and 9a are reduced to then increase the leakage magnetic flux, and thus this imposes the limitation on the improvement of the output characteristic. Moreover, since such increase of the areas of the pole pieces results in the increase of the demagnetizing force due to the armature reaction, the output current Is in the saturation state cannot achieve the sufficient output improvement, so that it is extremely difficult to improve the output from the low speed range to the high speed range.

SUMMARY OF THE INVENTION

The present invention has been made to overcome such subjects, and it is an object of the present invention to provide a vehicle AC generator capable of improving the output characteristics in the full rotation range from the low speed range equivalent to the idling rotational speed to the output current saturation range as the normal using range.

A vehicle AC generator according to the present invention comprises a stator core having a stator coil; a first rotor core and a second rotor core provided on an inner diameter side of the stator core to be fixed to a rotation axis; a field coil for magnetizing the first rotor core and the second rotor core; and a plurality of pole pieces provided on the first rotor core and the second rotor core to extend in an axis direction of the rotation axis, and arranged to engage alternatively with each other via a predetermined clearance, and provided to oppose to an inner diameter surface of the stator core via a predetermined clearance; wherein the poles pieces are formed into an almost trapezoidal shape to reduce a width toward its tip portion in a rotation direction, and a skew angle against the axis direction of both side surfaces of the pole pieces in a rotation direction is set small on a root side and also set large on a tip side.

Also, the skew angle of both side surfaces of the pole pieces is set small in angle in about ⅔ of a total length between the root side to the tip side from the root side and set large in angle in about ⅓ on the tip side.

Further, chamferings are formed on corner portions between an outer surface opposing to the stator core of the pole piece and both side surfaces in the rotation direction.

Furthermore, a rotation direction wide dimension of the chamferings formed on corners between an outer surface of the pole piece and both end surfaces in the rotation direction is set small on the root side of the pole piece and is set large on the tip side.

Moreover, a radial direction depth of the chamferings formed on corners between an outer surface of the pole piece and both end surfaces in a radial direction is set small on the root side of the pole piece and is set large on the tip side.

DETAILED DESCRIPTION OF THE PREFERRED EMBODIMENTS

Embodiment 1

Figure 1:
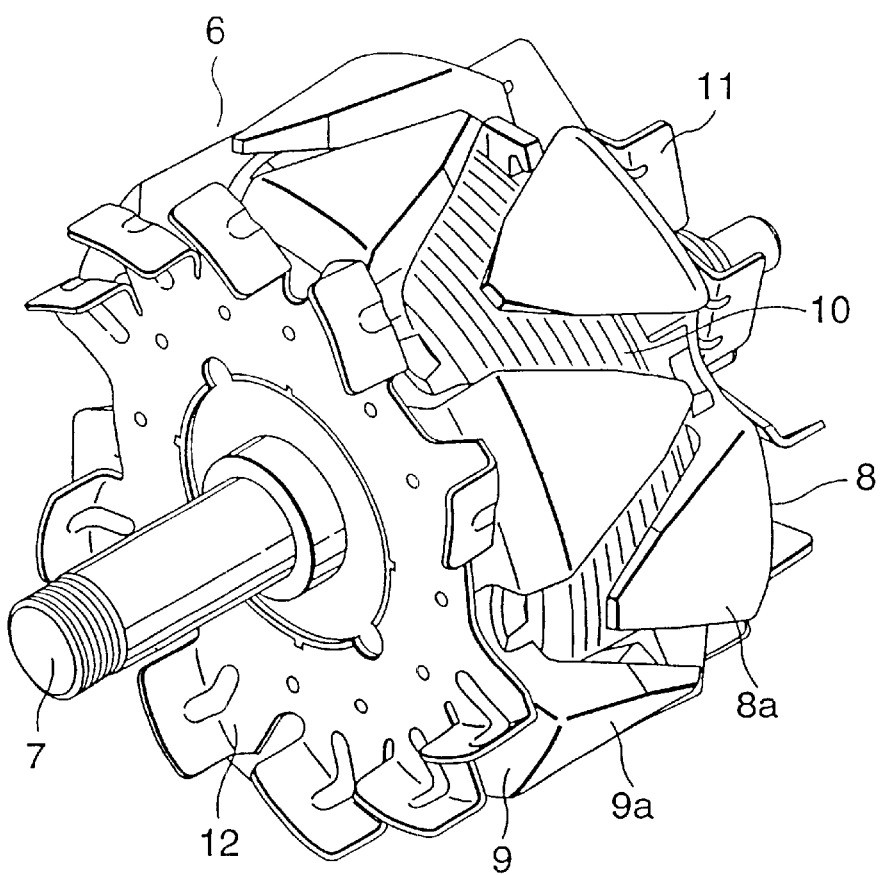
FIG. 1 is a perspective view showing a configuration of a rotor employed in a vehicle AC generator according to an embodiment 1 of the present invention.
Figure 2:
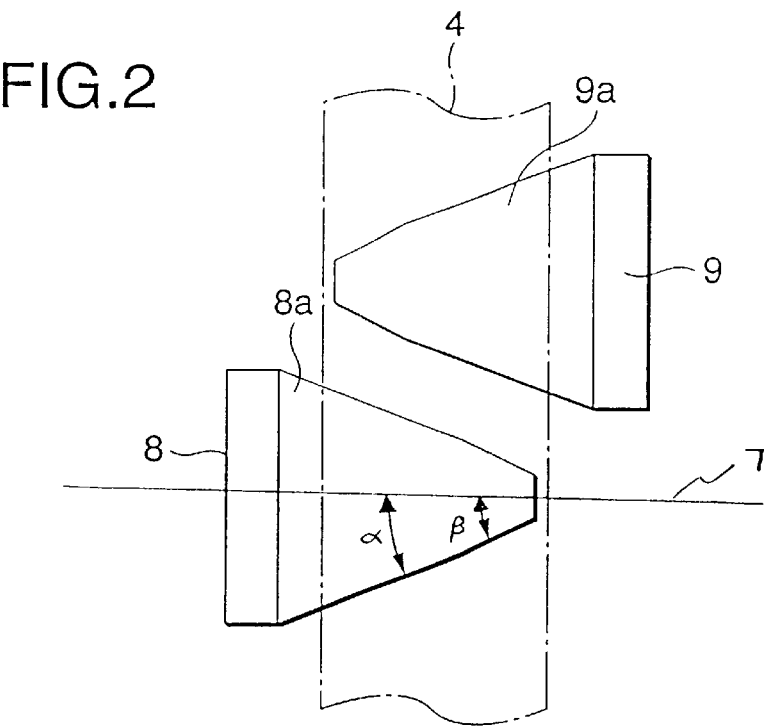
FIG. 2 is a top view showing shapes of pole pieces of rotor cores employed in the vehicle AC generator according to the embodiment 1 of the present invention.
Figure 6:
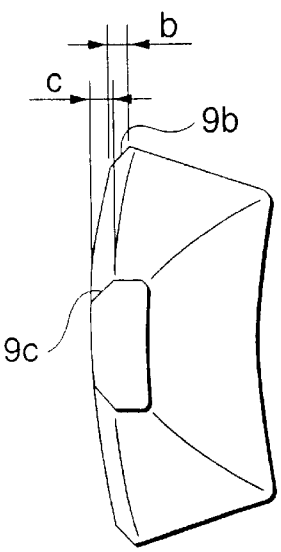
FIG. 6 is a side sectional view showing a pole piece of a rotor core employed in the vehicle AC generator according to the embodiment 3 of the present invention.
Figure 7:
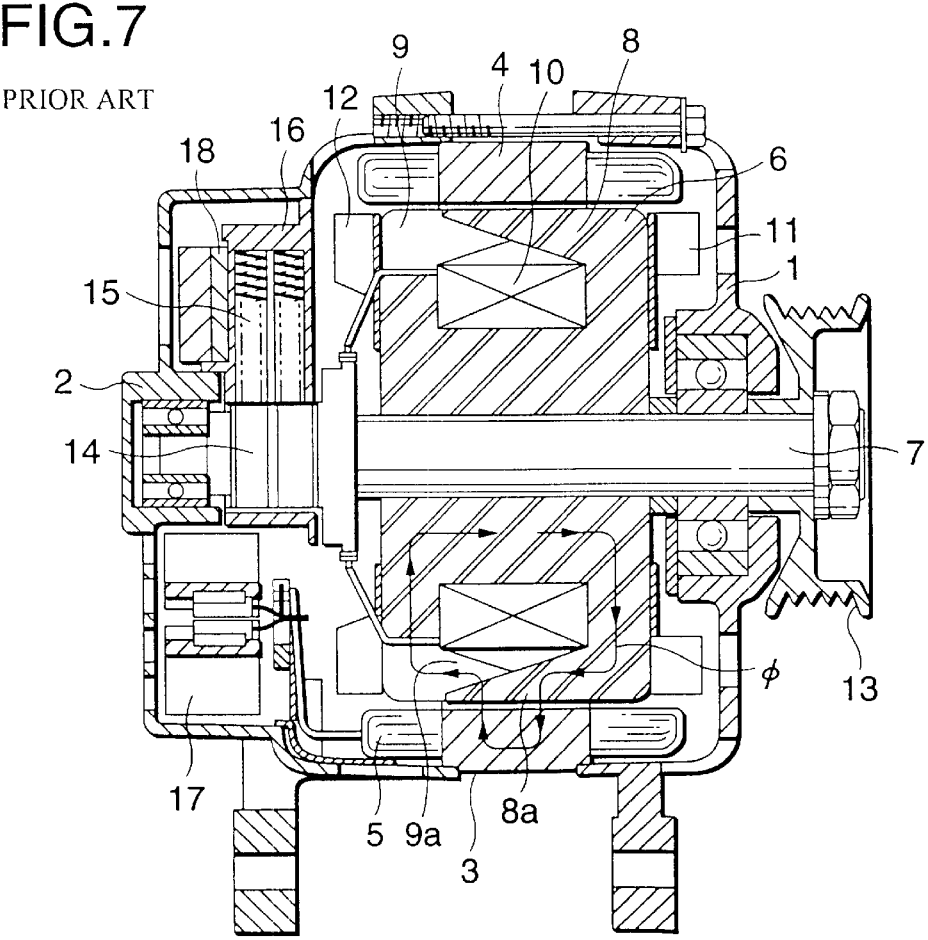
FIG. 7 is a sectional view showing a configuration of a vehicle AC generator in the prior art.
Figure 8:
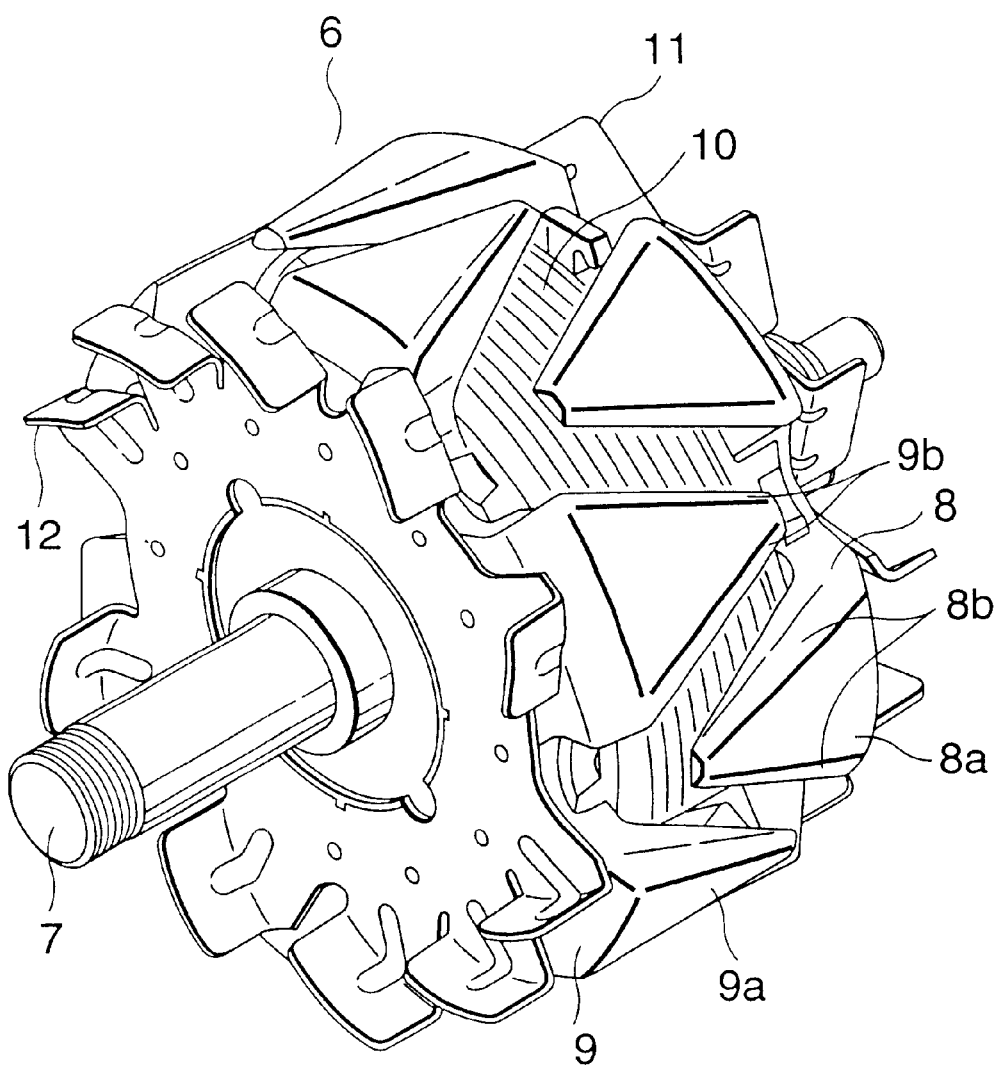
FIG. 8 is a perspective view showing a rotor of the vehicle AC generator in the prior art.
Figure 9:
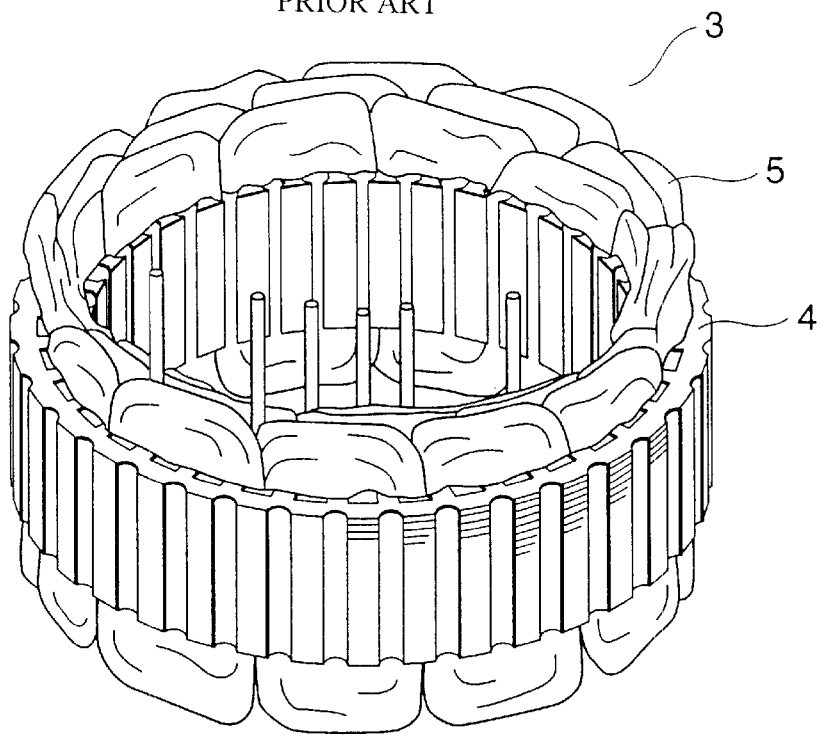
FIG. 9 is a perspective view showing a stator of the vehicle AC generator in the prior art.
Figure 10:
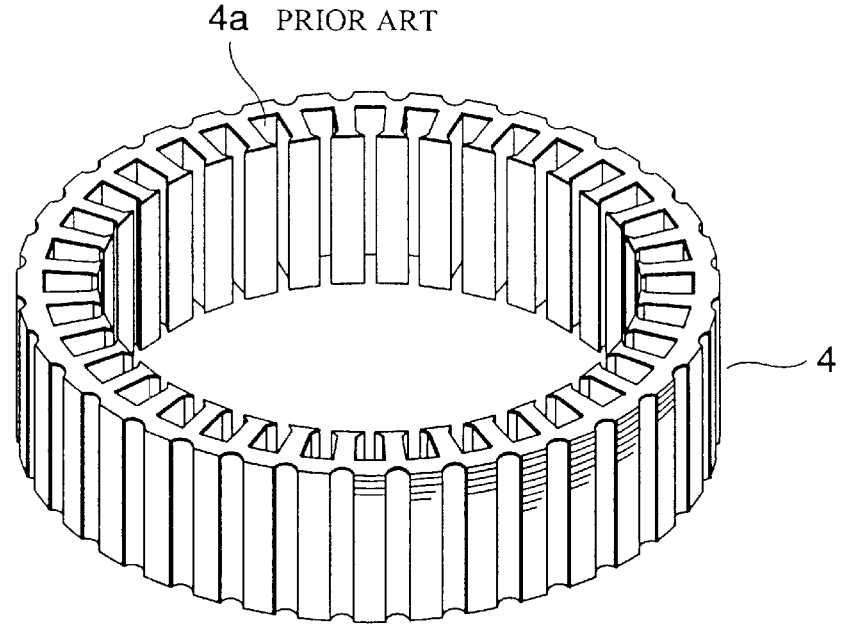
FIG. 10 is a perspective view showing a stator core of the vehicle AC generator in the prior art.
Figure 11:
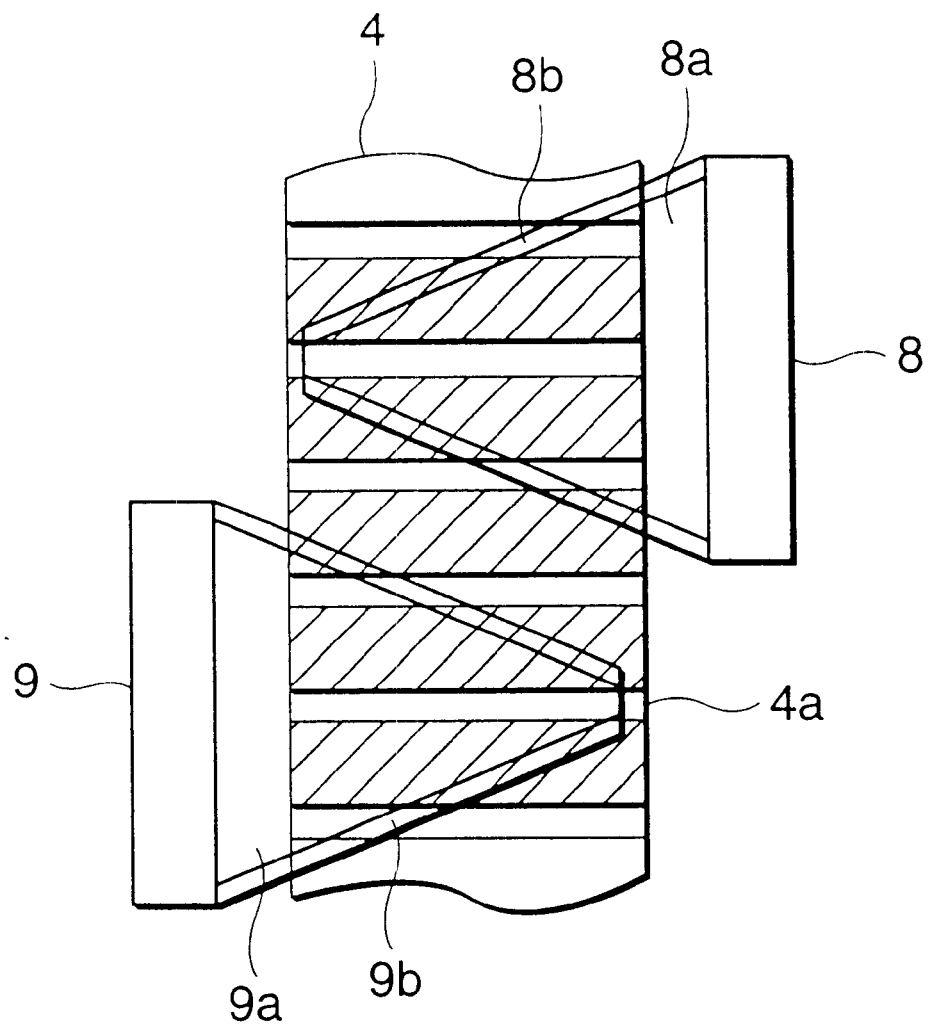
FIG. 11 is an illustrative view showing a relationship between the rotor cores and the stator core of the vehicle AC generator in the prior art.

FIG. 1 and FIG. 2 show a configuration of a vehicle AC generator according to an embodiment 1 of the present invention. FIG. 1 is a perspective view of a rotor, and FIG. 2 is a top view showing shapes of pole pieces of the rotor. Same symbols are affixed to the same functional portions as the above prior art. In addition, since the overall configuration of the generator other than the structure of the rotor described in the following is similar to that in FIG. 7 described in the above prior art, its detailed explanation will be omitted herein. In FIG. 1 and FIG. 2, 6 denotes a rotor employed in the vehicle AC generator. The rotor 6 comprises a rotation axis 7, a first rotor core 8 and a second rotor core 9 fixed to the rotation axis 7, a field coil 10 wound between both rotor cores 8 and 9 to magnetize them into different magnetic poles, and fans 11, 12 provided on back surfaces of both rotor cores 8 and 9. As shown in FIG. 7, a slip ring 14 is fixed to the rotation axis 7 and both ends of the rotation axis 7 are rotatably supported by a front bracket 1 and a rear bracket 2.

Then, 8a and 9a are almost trapezoidal pole pieces that are provided in a plurality to extend along the axis direction of the rotation axis 7 respectively. The pole pieces 8a and 9a are opposed to the inner diameter of the stater-core 4 via the predetermined clearance to rotate. Skew angles are formed in respective pole pieces to reduce their widths toward the tip portion in the rotation direction. These skew angles are selected in the pole pieces 8a, 9a, as shown in FIG. 1, such that the skew angle in about ⅔ of the total length of the pole piece from its root portion is set to an angle a and the skew angle in about ⅓ of the total length is set to an angle β, i.e., the remaining top portion of the pole piece, so that a relation of a α<β is satisfied in the skew angles. Also, these pole pieces 8a and 9a are arranged to alternatively engage with each other via the predetermined clearance, and one is magnetized into the N pole and the other magnetized into the S pole.

In this manner, in the AC generator in which the pole pieces 8a and 9a are formed into the almost trapezoidal shape respectively to reduce their widths toward the tip portion in the rotation direction and which has the fields being magnetized into different polarities alternatively, 95% or more of the field magnetic flux generated by excitation of the field coil 10 is supplied to the stator core 4 located in about ⅔ of the total length of the pole pieces 8a, 9a from their root portion, while the field magnetic flux supplied to the stator core 4 located in about ⅓ of the total length of the top portion becomes a very small amount. Meanwhile, the armature reaction caused by the output current flowing through the stator coil 5 acts in the total length of the pole pieces 8a, 9a.

In the vehicle AC generator according to the embodiment 1 of the present invention, as described above, since the skew angle in about ⅔ from their root portions of the pole pieces 8a, 9a is set to the angle α and the skew angle in about ⅓ of the top portion is set to the angle β and that the relation of α<β is given between respective skew angles, areas located in about ⅔ from their root portions are expanded in the rotation direction and areas located in about ⅓ of the top portions are contracted in the rotation direction, so that the magnetic reluctance for the magnetic flux generated by the armature reaction in the air gap can be increased while reducing the magnetic reluctance for the field magnetic flux in the air gap. Therefore, a magnetic flux amount of the field magnetic field by the excitation of the field coil 10 can be enhanced and the demagnetizing force due to the armature reaction in the high speed range can be suppressed. As a result, the output can be improved from the low speed range to the high speed range.

Furthermore, since the skew angles of the pole pieces 8a, 9a are set as α<β and the α portion is set to about ⅔ from the root portion, the areas of the pole pieces 8a, 9a located in such portion are expanded in the rotation direction, but reduction of the clearance between the neighboring pole pieces due to such area expansion can be suppressed within ⅓ of the total length between adjacent pole pieces 8a, 9a since the skew angle is large in about ⅓ of the top portions. Thus, the increase of the leakage magnetic flux becomes very small not to affect largely the improvement of the output characteristic. In addition, since a weight of the tip portion can be reduced by increasing the skew angle of the tip portion of the pole piece, the tolerance against the centrifugal force and the vibration in the high speed revolution can be improved, and the electromagnetic sound can be reduced because the electromagnetic shaking force can also be reduced.

Embodiment 2

Figure 3:
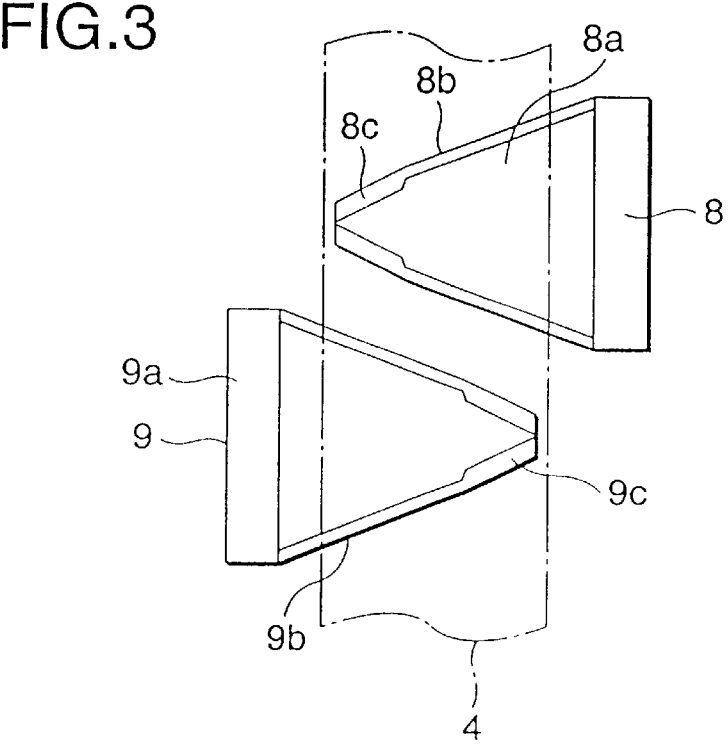
FIG. 3 is a top view showing pole pieces of rotor cores employed in a vehicle AC generator according to an embodiment 2 of the present invention.
Figure 4:
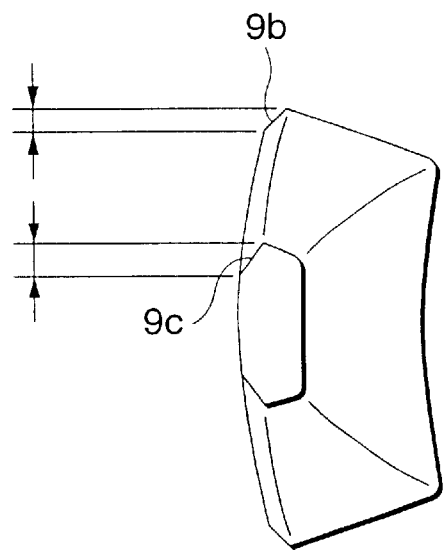
FIG. 4 is a sine sectional view showing a pole piece of a rotor core employee in a vehicle AC generator according to an embodiment 2 of the present invention.

FIG. 3 is a top view showing pole pieces of rotor cores employed in a vehicle AC generator according to an embodiment 2 of the present invention. FIG. 4 is a side sectional view showing a pole piece portion of a rotor core. In the pole pieces 8a and 9a in this embodiment, chamferings 8b, 8c and 9b, 9c are formed on corners between surfaces opposing to the inner diameter surface of the stator core 4 and both end surfaces in the rotation direction, and also a width dimension b of the chamferings 8b and 9b in an about ⅔ length on the root side in the rotation direction is set small but a width dimension c of the chamferings 8c and 9c in an about ⅓ length on the tip side in the rotation direction. is set large. According to the above configuration, the electromagnetic sound can be reduced because the magnetic flux distribution is smoothed, and also the magnetic reluctance of the root portion can be decreased and the magnetic reluctance of the tip portion can be increased. Thus, a magnetic flux amount of the field magnetic field can be enhanced and the demagnetizing force generated by the armature reaction in the high speed range can be suppressed. As a result, the output can be improved over the full rotational range.

Embodiment 3

Figure 5:
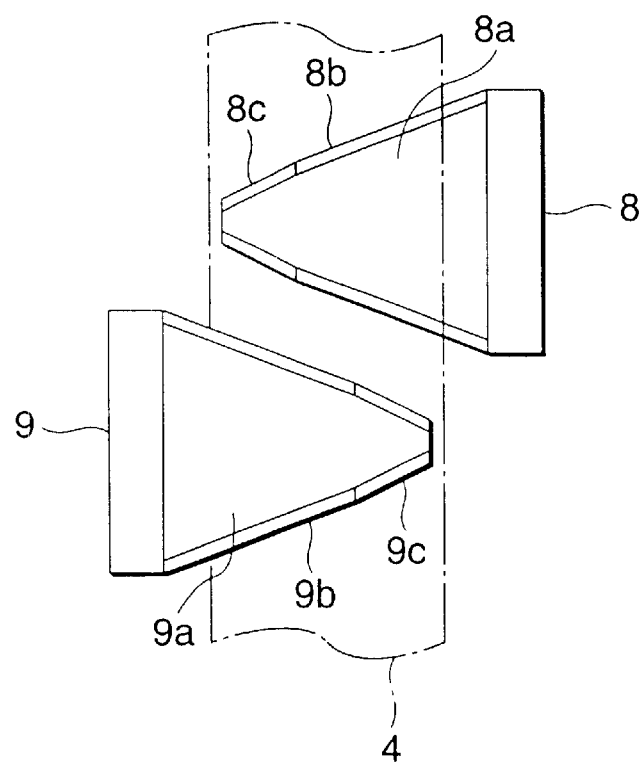
FIG. 5 is a top view showing pole pieces of rotor cores employed in a vehicle AC generator according to an embodiment 3 of the present invention.

FIG. 5 is a top view showing pole pieces of rotor cores employed in a vehicle AC generator according to an embodiment 3 of the present invention. FIG. 6 is a side sectional view showing a pole piece portion of a rotor core. In the pole pieces 8a and 9a in this embodiment, chamferings 8b, 8c and 9b, 9c are formed on corners between surfaces opposing to the inner diameter surface of the stator core 4 and both end surfaces in the rotation direction, and also a depth dimension b of the chamferings 8b and 9b in an about ⅔ length on the root side in the radial direction is set small but a depth dimension c of the chamferings 8c and 9c in an about ⅓ length on the tip side in the depth direction is set large. According to the above configuration, like the case in the embodiment 2, the electromagnetic sound can be reduced because the magnetic flux distribution is smoothed, and also the magnetic reluctance of the root portion can be decreased and the magnetic reluctance of the tip portion can be increased. Thus, a magnetic flux amount of the field magnetic field can be enhanced and the demagnetizing force generated by the armature reaction in the high speed range can be suppressed. As a result, the output can be improved over the full rotational range. Moreover, respective advantages can be superposed by applying the embodiments 2 and 3 at the same time.

In the above embodiments, the number of poles of the rotor is 12, the number of poles of the stator core is 36, and thus the number of poles of the stator core per pole and phase is 1. In this case, it is more advantageous if the present invention is applied to the vehicle AC generator in which the leakage of the magnetic flux in the pole piece can be reduced by setting the number of poles per pole and phase to 2 or more to narrow the pole piece of the stator core in the rotation direction and also the magnetic reluctance of the surface of the rotor pole can be reduced by increasing the number to expand the total area of the surface of the pole piece.

Besides, in the above embodiments, the field coil is contained in the rotor. In this case, the present invention can be applied to the vehicle AC generator of the type in which the field coil is fixed to the bracket and the field magnetic field is supplied from the air gap.

As explained above, according to the vehicle AC generator of the present invention, the pole area in about ⅔ from the root portion is expanded and the pole area in about ⅓ of the tip portion is contracted by setting the skew angle of the almost trapezoidal pole pieces in about ⅔ from the root portion small and setting the skew angle in about ⅓ of the tip portion large, and also the width dimension in the rotation direction of the depth dimension in the radial direction or both dimensions of the chamferings formed on the corners between the surface of the outer surface of the pole piece opposing to the stator core and both end surfaces in the rotation direction is set small in about ⅔ from the root portion and set large in about ⅓ of the tip portion. Therefore, the excellent vehicle AC generator can be accomplished such that the magnetic reluctance in about ⅔ from the root portion can be set small and the magnetic reluctance in about ⅓ of the tip portion can be set large, and the output can be improved in the full range from the low speed range to the high speed range because the magnetic reluctance for the filed magnetic flux can be reduced and the magnetic reluctance for the armature reaction can be increased, and the mechanical tolerance against the centrifugal force and the vibration can be improved, etc.

What is claimed is:

1. A vehicle AC generator comprising:

a stator core having a stator coil;

a first rotor core and a second rotor core provided on an inner diameter side of said stator core to be fixed to a rotation axis;

a field coil for magnetizing said first rotor core and said second rotor core; and a plurality of pole pieces provided on said first rotor core and said second rotor core to extend in an axis direction of the rotation axis, and arranged to engage alternatively with each other via a predetermined clearance, and provided to oppose to an inner diameter surface of said stator core via a predetermined clearance; wherein said poles pieces are formed into a substantially trapezoidal shape to reduce a width toward a tip portion thereof in a rotation direction, and two skew angles with respect to the rotation axis are formed on both side surfaces of each of said pole pieces, and a first skew angle at a root portion of said pole pieces is smaller than said second skew angle at a tip portion of said pole pieces.

2. The vehicle AC generator according to claim 1, wherein the first skew angle is set at a portion of approximately ⅔ of a total length of the pole pieces, and the second skew angle is set at a portion of approximately ⅓ of the total length, wherein the total length is measured from the root to the tip portion of the pole pieces.

3. The vehicle AC generator according to claim 1, wherein, chamferings are formed on corner portions between an outer surface opposing to said stator core of said pole piece and both side surfaces in the rotation direction.

4. The vehicle AC generator according to claim 3, wherein a rotation direction wide dimension of the chamferings formed on corners between an outer surface of said pole pieces and both end surfaces in the rotation direction is set small on the root portion of said pole pieces, and is set large on the tip portion of said pole pieces.

5. The vehicle AC generator according to claim 3, wherein a radial direction depth of the chamferings formed on corners between an outer surface of said pole pieces and both end surfaces in a radial direction is set small on the root portion of said pole pieces, and is set large on the tip portion of said pole pieces.

* * * * *